(12) United States Patent
Xiao et al.

(10) Patent No.: US 12,513,535 B2
(45) Date of Patent: Dec. 30, 2025

(54) METHODS AND APPARATUSES FOR PHYSICAL UPLINK SHARED CHANNEL TRANSMISSION

(71) Applicant: Lenovo (Beijing) Limited, Beijing (CN)

(72) Inventors: Lingling Xiao, Beijing (CN); Bingchao Liu, Beijing (CN); Chenxi Zhu, Fairfax, VA (US); Wei Ling, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 335 days.

(21) Appl. No.: 18/039,370

(22) PCT Filed: Nov. 30, 2020

(86) PCT No.: PCT/CN2020/132731
§ 371 (c)(1),
(2) Date: May 30, 2023

(87) PCT Pub. No.: WO2022/110134
PCT Pub. Date: Jun. 2, 2022

(65) Prior Publication Data
US 2024/0015525 A1 Jan. 11, 2024

(51) Int. Cl.
*H04W 16/28* (2009.01)
*H04W 72/1268* (2023.01)
*H04W 72/232* (2023.01)

(52) U.S. Cl.
CPC ....... *H04W 16/28* (2013.01); *H04W 72/1268* (2013.01); *H04W 72/232* (2023.01)

(58) Field of Classification Search
CPC ..... H04B 7/022; H04L 5/0023; H04L 5/0044; H04L 5/006; H04W 16/28; H04W 72/1268; H04W 72/232; Y02D 30/70
See application file for complete search history.

(56) References Cited

U.S. PATENT DOCUMENTS

| | | | |
|---|---|---|---|
| 11,510,239 B2 * | 11/2022 | Cirik | H04W 74/002 |
| 11,937,098 B2 * | 3/2024 | Zhang | H04B 7/022 |

(Continued)

FOREIGN PATENT DOCUMENTS

| | | | | |
|---|---|---|---|---|
| CA | 3090156 A1 * | 2/2021 | | H04W 4/0833 |
| CN | 111316739 A * | 6/2020 | | H04W 72/23 |

(Continued)

OTHER PUBLICATIONS

PCT/CN2020/132731, "International Preliminary Report on Patentability", PCT Application No. PCT/CN2020/132731, Jun. 15, 2023, 6 pages.
PCT/CN2020/132731, "International Search Report and Written Opinion", PCT Application No. PCT/CN2020/132731, Aug. 19, 2021, 7 pages.

(Continued)

*Primary Examiner* — Eric Nowlin
(74) *Attorney, Agent, or Firm* — FIG. 1 Patents

(57) ABSTRACT

Disclosed are methods for an uplink signal transmission. One embodiment of the subject application provides a method performed by a UE, including determining a spatial relation for a Physical Uplink Shared Channel transmission scheduled by Downlink Control Information format 0_0 in response to that a Physical Uplink Control Channel resource with the lowest Identification among at least one PUCCH resource configured in an active uplink bandwidth part of a serving cell is activated with at least two spatial relations, and performing the PUSCH transmission at least according to the spatial relation with a transmission power calculated based on a pathloss reference signal. Related apparatuses are also disclosed.

20 Claims, 4 Drawing Sheets

| PUCCH resource #ID | Spatial relation(s) #*PUCCH-SpatialRelationInfoId* |
|---|---|
| PUCCH resource #0 | spatial relation #5 and spatial relation #2 |
| PUCCH resource #1 | spatial relation #0 |
| PUCCH resource #2 | spatial relation #6 and spatial relation #7 |

(56) References Cited

U.S. PATENT DOCUMENTS

| | | | |
|---|---|---|---|
| 12,150,143 B2* | 11/2024 | Sun | H04L 5/0035 |
| 12,213,122 B2* | 1/2025 | Guo | H04W 72/046 |
| 2020/0053717 A1* | 2/2020 | Zhou | H04W 72/21 |
| 2020/0229104 A1 | 7/2020 | Molavian et al. | |
| 2021/0029708 A1* | 1/2021 | Khoshnevisan | H04L 1/1864 |
| 2021/0051710 A1* | 2/2021 | Cirik | H04W 74/0833 |
| 2022/0014284 A1* | 1/2022 | Ryu | H04W 24/08 |
| 2022/0070853 A1* | 3/2022 | Guo | H04B 17/336 |
| 2022/0216929 A1* | 7/2022 | Matsumura | H04L 5/0048 |
| 2022/0303788 A1* | 9/2022 | Zhang | H04B 7/0404 |
| 2022/0312392 A1* | 9/2022 | Sun | H04W 24/02 |
| 2022/0312426 A1* | 9/2022 | Sun | H04W 72/542 |
| 2022/0353698 A1* | 11/2022 | Jang | H04L 5/0053 |
| 2023/0037661 A1* | 2/2023 | Cirik | H04L 5/0053 |
| 2023/0080392 A1* | 3/2023 | Chen | H04W 72/23 370/329 |
| 2023/0262696 A1* | 8/2023 | Chen | H04L 5/0023 370/329 |

FOREIGN PATENT DOCUMENTS

| | | | | |
|---|---|---|---|---|
| CN | 111699635 A | * | 9/2020 | H04W 72/23 |
| EP | 3780872 A1 | * | 2/2021 | H04W 74/0833 |
| EP | 4117363 A1 | * | 1/2023 | H04W 72/1268 |
| EP | 4185037 B1 | * | 5/2024 | H04L 5/0053 |
| EP | 4205476 B1 | * | 8/2025 | H04W 72/23 |
| EP | 4611465 A2 | * | 9/2025 | H04W 72/23 |
| JP | 2023525745 A | * | 6/2023 | H04W 72/1268 |
| WO | WO-2020075138 A1 | * | 4/2020 | H04W 52/36 |
| WO | WO-2020218900 A1 | * | 10/2020 | H04W 52/346 |

OTHER PUBLICATIONS 20963022.7, "European Search Report", Application No. 20963022.7, Jul. 15, 2024, 8 pages.

Nokia (Rapporteur), "Offline 504 on NR-U in 38.300", 3GPP TSG-RAN WG2 Meeting #111 Electronic R2-2008475, Aug. 28, 2020, 7 pages.

* cited by examiner

| PUCCH resource #ID | Spatial relation(s) #PUCCH-SpatialRelationInfoId |
|---|---|
| PUCCH resource #0 | spatial relation #5 and spatial relation #2 |
| PUCCH resource #1 | spatial relation #0 |
| PUCCH resource #2 | spatial relation #6 and spatial relation #7 |
Figure 1
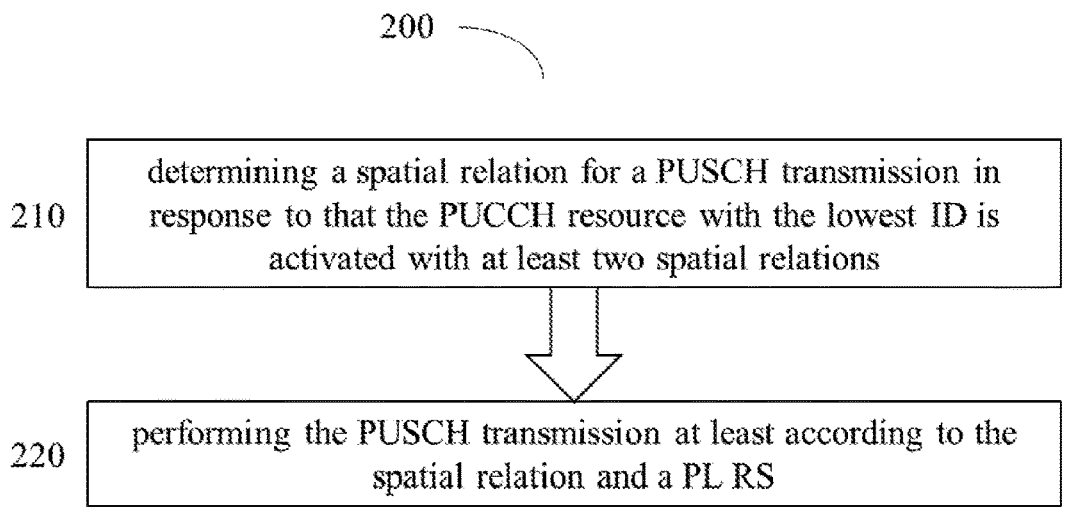
Figure 2
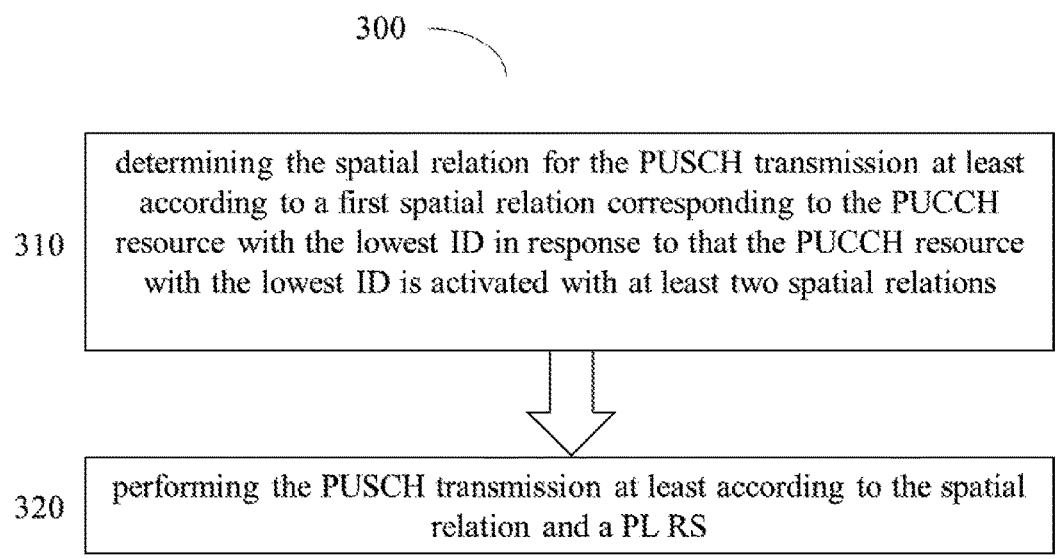
Figure 3

| PUCCH resource #ID | Spatial relation(s) #PUCCH-SpatialRelationInfoId |
|---|---|
| PUCCH resource #0 | spatial relation#0 and spatial relation#10 |
| PUCCH resource #1 | spatial relation#11 and spatial relation#12 |
| PUCCH resource #2 | spatial relation#33 |
| PUCCH resource #3 | spatial relation#5 |
| PUCCH resource #4 | spatial relation#7 and spatial relation#45 |
| PUCCH resource #5 | spatial relation#53 |
| PUCCH resource #6 | spatial relation#11 and spatial relation#22 |
| PUCCH resource #7 | spatial relation#40 |

Figure 6

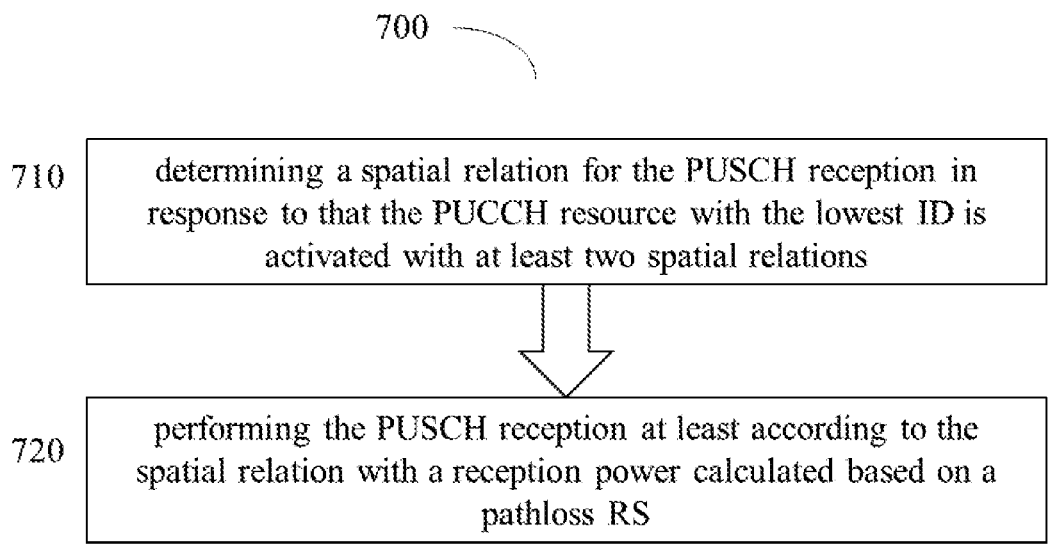

Figure 7

METHODS AND APPARATUSES FOR PHYSICAL UPLINK SHARED CHANNEL TRANSMISSION

TECHNICAL FIELD

Various example embodiments relate to methods and apparatuses for transmissions of Physical Uplink Shared Channel (PUSCH) signal scheduled by Downlink Control Information (DCI) format 0_0.

BACKGROUND OF THE INVENTION

In 3GPP ($3^{rd}$ Generation Partnership Project), an uplink signal is transmitted to a base station (BS) (e.g., an evolved Node B, an eNB) according to a spatial relation with a transmission power calculated based on a pathloss reference signal (RS). The uplink signal may be a Physical Uplink Control Channel (PUCCH), a PUSCH, a Sounding Reference Signal (SRS), etc.

SUMMARY

One embodiment of the subject disclosure provides a method performed by a user equipment (UE), including determining a spatial relation for a PUSCH transmission scheduled by DCI format 0_0 in response to that a PUCCH resource with the lowest Identification (ID) among at least one PUCCH resource configured in an active uplink bandwidth part (BWP) of a serving cell is activated with at least two spatial relations, and performing the PUSCH transmission at least according to the spatial relation with a transmission power calculated based on a pathloss RS.

In some embodiments, the determination of the spatial relation for the PUSCH transmission further includes determining the spatial relation for the PUSCH transmission at least according to a first spatial relation corresponding to the PUCCH resource with the lowest ID.

In some embodiments, the determination of the spatial relation for the PUSCH transmission further includes determining the spatial relation for the PUSCH transmission at least according to a spatial relation with a lowest PUCCH-SpatialRelationInfoId corresponding to the PUCCH resource with the lowest ID.

In some embodiments, the determination of the spatial relation for the PUSCH transmission further includes determining the spatial relation for the PUSCH transmission at least according to a spatial relation corresponding to a PUCCH resource with a lowest ID among at least one PUCCH resource activated with only one spatial relation.

In some embodiments, the pathloss RS for the PUSCH transmission is an RS resource with an index corresponding to pucchPathlossReferenceRS-Id configured in the determined spatial relation.

One embodiment of the subject disclosure provides a method performed by a BS, including determining a spatial relation for a PUSCH reception scheduled by DCI format 0_0 in response to that a PUCCH resource with the lowest ID among at least one PUCCH resource configured in an active uplink BWP of a serving cell is activated with at least two spatial relations, and performing the PUSCH reception at least according to the spatial relation with a reception power calculated based on a pathloss RS.

In some embodiments, the determination of the spatial relation for the PUSCH reception further includes determining the spatial relation for the PUSCH reception at least according to a first spatial relation corresponding to the PUCCH resource with the lowest ID.

In some embodiments, the determination of the spatial relation for the PUSCH reception further includes determining the spatial relation for the PUSCH reception at least according to a spatial relation with a lowest PUCCH-SpatialRelationInfoId corresponding to the PUCCH resource with the lowest ID reception.

In some embodiments, the determination of the spatial relation for the PUSCH reception further includes determining the spatial relation for the PUSCH reception at least according to a spatial relation corresponding to a PUCCH resource with a lowest ID among at least one PUCCH resource activated with only one spatial relation.

In some embodiments, the pathloss RS for the PUSCH reception is an RS resource with an index corresponding to pucchPathlossReferenceRS-Id configured in the determined spatial relation.

Another embodiment of the subject application provides an apparatus, which indicates a non-transitory computer-readable medium having stored thereon computer-executable instructions, a receiving circuitry, a transmitting circuitry, and a processor coupled to the non-transitory computer-readable medium, the receiving circuitry and the transmitting circuitry. The computer-executable instructions cause the processor to implement a method performed by a UE. The method includes determining a spatial relation for a PUSCH transmission scheduled by DCI format 0_0 in response to that a PUCCH resource with the lowest ID among at least one PUCCH resource configured in an active uplink BWP of a serving cell is activated with at least two spatial relations, and performing the PUSCH transmission at least according to the spatial relation with a transmission power calculated based on a pathloss RS.

A further embodiment of the subject application provides an apparatus, which indicates a non-transitory computer-readable medium having stored thereon computer-executable instructions, a receiving circuitry, a transmitting circuitry, and a processor coupled to the non-transitory computer-readable medium, the receiving circuitry and the transmitting circuitry. The computer-executable instructions cause the processor to implement a method performed by a BS. The method includes determining a spatial relation for a PUSCH reception scheduled by DCI format 0_0 in response to that a PUCCH resource with the lowest ID among at least one PUCCH resource configured in an active uplink BWP of a serving cell is activated with at least two spatial relations, and performing the PUSCH reception at least according to the spatial relation with a transmission power calculated based on a pathloss RS.

BRIEF DESCRIPTION OF THE DRAWINGS

Some example embodiments will now be described, by way of non-limiting examples, with reference to the accompanying drawings.

FIG. 1 illustrates an example of PUCCH resource configuration.

FIG. 2 illustrates an exemplary method for a PUSCH transmission.

FIG. 3 illustrates an exemplary method for a PUSCH transmission.

FIG. 6 illustrates an example of PUCCH resource configuration.

FIG. 7 illustrates an exemplary method for a PUSCH reception.

DETAILED DESCRIPTION

Figure 4:
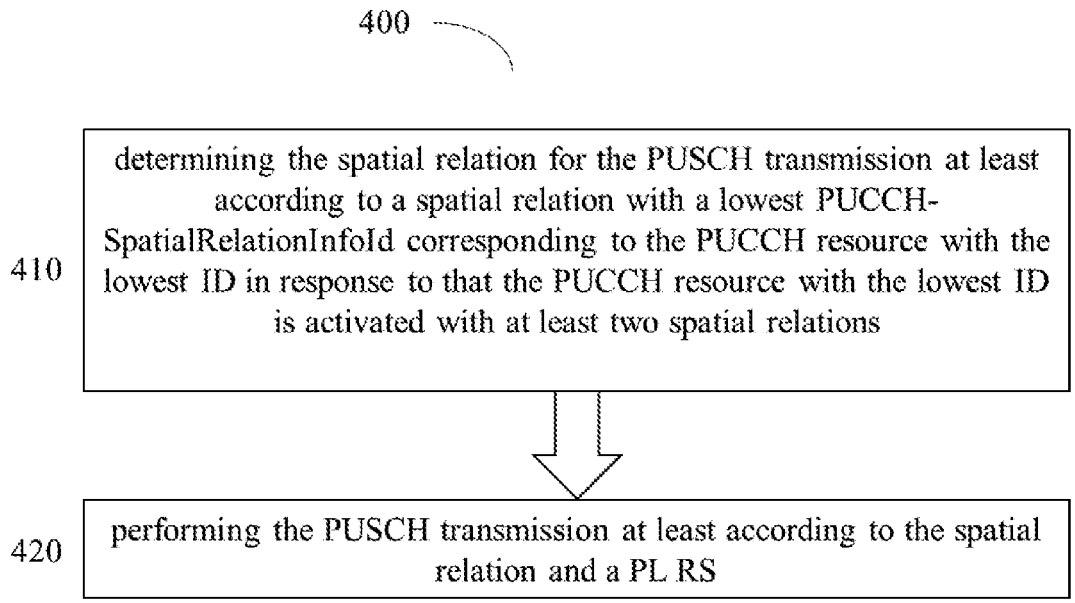
FIG. 4 illustrates an exemplary method for a PUSCH transmission.

The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some embodiments of the present application, examples of which are illustrated in the accompanying drawings. To facilitate understanding, embodiments are provided under specific network architecture and new service scenarios, such as 3GPP 5G and so on. It is contemplated that along with developments of network architectures and new service scenarios, all embodiments in the present application are also applicable to similar technical problems, and moreover, the terminologies recited in the present application may change, which should not affect the principle of the present application.

The present disclosure generally relates to a PUSCH transmission scheduled by DCI format 0_0. There is no Signal resource indicator (SRI) field in DCI format the UE transmits a PUSCH according to the spatial relation corresponding to the dedicated PUCCH resource with the lowest ID within the active UL uplink BWP of the serving cell and uses the same PL-RS resource with index as for a PUCCH transmission in the PUCCH resource with the lowest index.

In Rel-16, only one spatial relation is activated for each PUCCH resource in an active uplink BWP of the serving cell, the UE may use the spatial relation and the pathloss RS corresponding to the dedicated PUCCH signal resource with lowest ID among the PUCCH resources configured in an active BWP in a serving cell for a PUSCH transmission scheduled by DCI format 0_0.

However, to improve reliability and robustness of a PUCCH transmission, a PUCCH transmission towards multiple transceiver points (TRPs) and/or multi-panel are introduced in Rel-17: one or more spatial relations may be activated for a PUCCH resource that different repetitions of a PUCCH towards different TRPs are transmitted with different spatial relations. Since there is no SRI field in DCI format 0_0, PUSCH transmissions scheduled by DCI format 0_0 cannot support repetition transmission, in case where at least two spatial relations are activated for the dedicated PUCCH resource with the lowest ID, the UE needs to determine one spatial relation for PUSCH transmissions; and the UE needs also to determine the corresponding pathloss RS for PUSCH transmissions.

The present disclosure relates to the determination of the spatial relation and pathloss RS for the PUSCH transmission scheduled by DCI format 0_0 (for example, the PUSCH scheduled by DCI format 0_0) in a scenario where the PUCCH resource with the lowest ID in the active uplink BWP of the serving cell is activated with at least two spatial relations.

FIG. 1 illustrates such an example for PUCCH resources configuration in an active uplink BWP of a serving cell. In this example, three PUCCH resources are configured: PUCCH resource #0, PUCCH resource #1, and PUCCH resource #2. Media access control (MAC) control element (MAC-CE) activates spatial relation #5 and spatial relation #2 for PUCCH resource #0, activates spatial relation #0 for PUCCH resource #1, and activates spatial relation #6 and spatial relation #7 for PUCCH resource #2, in which spatial relation #5, spatial relation #0, and spatial relation #6 are the first spatial relations for PUCCH resource #0, PUCCH resource #1, and PUCCH resource #2 respectively. The first spatial relation corresponding to a dedicated PUCCH resource means the spatial relation activated first in the MAC CE activation command among the spatial relations activated for the dedicated PUCCH resource.

In this example, the PUCCH resource with the lowest ID in the active uplink BWP of the serving cell is PUCCH #0, which is activated with two spatial relations: spatial relation #5 and spatial relation #2. In such a case, the UE and the BS need to determine the spatial relation and corresponding pathloss RS for PUSCH transmissions scheduled by DCI format 0_0.

FIG. 2 illustrates an exemplary method 200 executed by a UE for a PUSCH transmission scheduled by DCI format 0_0. As shown in FIG. 2, the method 200 may include a step 210 and a step 220. The step 210 illustrates determining a spatial relation for a PUSCH transmission scheduled by DCI format 0_0 in response to that a PUCCH resource with the lowest ID among at least one PUCCH resource configured in an active uplink BWP of a serving cell is activated with at least two spatial relations, and the step 220 illustrates performing the PUSCH transmission at least according to the spatial relation with a transmission power calculated based on a pathloss RS.

In some embodiments, the UE is in a Radio Resource Control (RRC) connection mode.

In some embodiments, the PUCCH resources in the present disclosure refer the dedicated PUCCH resources configured in PUCCH-Config.

In some embodiments, the UE is configured with one or more PUCCH resources on the active uplink BWP in the serving cell, and the PUCCH resources other than the PUCCH resource with the lowest ID are activated with at least one spatial relation.

In some embodiments, the pathloss RS for the PUSCH transmission is an RS resource with an index corresponding to pucchPathlossReferenceRS-Id configured in the determined spatial relation. In some embodiments, the pathloss RS for the PUSCH transmission may be determined in other feasible ways.

FIG. 3 illustrates an exemplary method 300 for a transmission of a PUSCH transmission scheduled by DCI format 0_0 based on method 200. As shown in FIG. 3, the method 300 may include a step 310 and a step 320. The step 310 illustrates determining the spatial relation for the PUSCH transmission scheduled by DCI format 0_0 at least according to the first spatial relation corresponding to a dedicated PUCCH resource with a lowest ID among at least one PUCCH resource configured in an active BWP of a serving cell in response to that the PUCCH resource with the lowest ID is activated with at least two spatial relations, and the step 320 illustrates performing the PUSCH transmission at least according to the spatial relation with a transmission power calculated based on a pathloss RS.

The first spatial relation corresponding to the dedicated PUCCH resource with the lowest ID means the spatial relation activated first in the MAC CE activation command among the spatial relations activated for the dedicated PUCCH resource with the lowest ID.

In some embodiments, the pathloss RS for the PUSCH transmission is an RS resource with an index corresponding to pucchPathlossReferenceRS-Id configured in the determined spatial relation.

For example, referring to FIG. 1 in combination with method 300, the dedicated PUCCH resource with a lowest ID is PUCCH resource #0; and the first spatial relation corresponding to PUCCH resource #0 is spatial relation #5. Therefore, in step 310, the UE may determine the spatial relation for the PUSCH transmission at least according to spatial relation #5.

In step 320, the pathloss RS for the PUSCH transmission is an RS resource with an index corresponding to pucchPathlossReferenceRS-Id configured in the spatial relation #5, the UE transmits the PUSCH at least according to the spatial relation #5 with a transmission power calculated based on the pathloss RS.

FIG. 4 illustrates an exemplary method 400 for a PUSCH transmission scheduled by DCI format 0_0 based on the method 200. As shown in FIG. 4, the method 400 may include a step 410 and a step 420. The step 410 illustrates determining the spatial relation for the PUSCH transmission at least according to a spatial relation with a lowest PUCCH-SpatialRelationInfoId of a dedicated PUCCH resource with a lowest ID among at least one PUCCH resource configured in an active uplink BWP of a serving cell in response to that the PUCCH resource with the lowest ID is activated with at least two spatial relations, and a step 420 illustrates transmitting the PUSCH at least according to the spatial relation with a transmission power calculated based on a pathloss RS.

In some embodiments, the pathloss RS for the PUSCH transmission is an RS resource with an index corresponding to pucchPathlossReferenceRS-Id configured in the determined spatial relation.

For example, referring to FIG. 1 in combination with method 400, the dedicated PUCCH resource with a lowest ID is PUCCH resource #0. The spatial relation with a lowest PUCCH-SpatialRelationInfoId of the dedicated PUCCH resource with the lowest ID is spatial relation #2. Therefore, in step 410, the UE may determine the spatial relation for the PUSCH transmission at least according to spatial relation #2.

In some embodiments, in step 420, the pathloss RS for the PUSCH transmission is an RS resource with an index corresponding to pucchPathlossReferenceRS-Id configured in the spatial relation #2, the UE transmits the PUSCH at least according to the spatial relation #2 with a transmission power calculated based on the pathloss RS.

Figure 5:
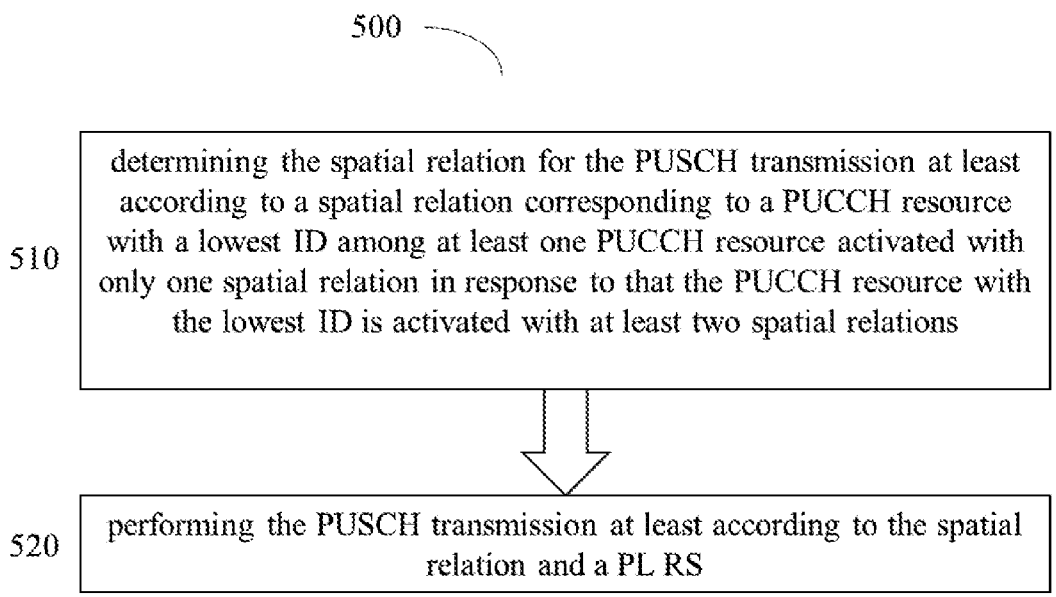
FIG. 5 illustrates an exemplary method for a PUSCH transmission.

FIG. 5 illustrates an exemplary method 500 for a PUSCH transmission based on the method 200. As shown in FIG. 5, the method 500 may include a step 510 and a step 520. The step 510 illustrates determining the spatial relation for the PUSCH transmission scheduled by DCI format 0_0 at least according to a spatial relation corresponding to a dedicated PUCCH resource with a lowest ID among at least one PUCCH resource activated with only one spatial relation in response to that the PUCCH resource with the lowest ID is activated with at least two spatial relations, and a step 520 illustrates transmitting the PUSCH at least according to the spatial relation with a transmission power calculated based on a pathloss RS.

In some embodiments, the pathloss RS for the PUSCH transmission is an RS resource with an index corresponding to pucchPathlossReferenceRS-Id configured in the determined spatial relation.

For example, referring to FIG. 1 in combination with method 500, only PUCCH resource #1 is activated with one spatial relation (i.e., spatial relation #0); therefore, the dedicated PUCCH resource with a lowest ID among at least one PUCCH resource activated with only one spatial relation is PUCCH resource #1, the UE may determine the spatial relation for the PUSCH transmission at least according to spatial relation #0.

In some embodiments, in step 520, the pathloss RS for the PUSCH transmission is an RS resource with an index corresponding to pucchPathlossReferenceRS-Id configured in the spatial relation #0, the UE transmits the PUSCH scheduled by DCI format 0_0 at least according to spatial relation #0 with a transmission power calculated based on the pathloss RS.

Referring to FIG. 6 showing another exemplary configuration for PUCCH resources in the active uplink BWP in a serving cell. As shown in FIG. 6, the BS configures eight PUCCH resources in the active uplink BWP in a serving cell: PUCCH resource #0, PUCCH resource #1 . . . , and PUCCH resource #7. MAC CE activates spatial relation #0 and spatial relation #10 for PUCCH resource #0, activates spatial relation #11 and spatial relation #12 for PUCCH resource #1, activates spatial relation #33 for PUCCH resource #2, activates spatial relation #5 for PUCCH resource #3, activates spatial relation #7 and spatial relation #45 for PUCCH resource #4, activates spatial relation #53 for PUCCH resource #5, activates spatial relation #11 and spatial relation #22 for PUCCH resource #6, and activates spatial relation #40 for PUCCH resource #7.

In this example, PUCCH resource #2, PUCCH resource #3, PUCCH resource #5, and PUCCH resource #7 are activated with one spatial relation.

According to method 500, the dedicated PUCCH resource with a lowest ID among at least one PUCCH resource activated with only one spatial relation is PUCCH resource #2; therefore, in step 510, the UE may determine the spatial relation for the PUSCH transmission at least according to spatial relation #33.

In some embodiments, in step 520, the pathloss RS index of the PUSCH corresponds to a pucchPathlossReferenceRS-Id configured in the spatial relation #33, the UE transmits the PUSCH at least according to the spatial relation #33 with a transmission power calculated based on the pathloss RS index which corresponds to the pucchPathlossReferenceRS-Id configured in spatial relation #33.

FIG. 7 illustrates an exemplary method 700 for a reception of a PUSCH scheduled by DCI format 0_0. The method 700 may be executed by a BS and corresponds to method 200. As shown in FIG. 7, method 700 may include a step 710 and a step 720. The step 710 illustrates determining a spatial relation for a PUSCH reception scheduled by DCI format 0_0 in response to that a PUCCH resource with the lowest ID among at least one PUCCH resource configured in an active uplink BWP in a serving cell is activated with at least two spatial relations, and a step 720 illustrates receiving the PUSCH at least according to the spatial relation with a reception power calculated based on a pathloss RS.

In some embodiments, the UE is in an RRC connection mode.

In some embodiments, the PUCCH resources in the present disclosure refer the dedicated PUCCH resources configured in PUCCH-Config.

In some embodiments, the active uplink BWP in the serving cell is configured with one or more PUCCH resources and the PUCCH resources other than the PUCCH resource with the lowest ID are activated with at least one spatial relation.

In some embodiments, the pathloss RS for the PUSCH reception is an RS resource with an index corresponding to pucchPathlossReferenceRS-Id configured in the determined spatial relation. In some embodiments, the pathloss RS for the PUSCH reception may be determined in other feasible ways.

In some embodiments, in step 710, the BS may determine the spatial relation for the PUSCH reception at least according to the first spatial relation corresponding to the dedicated PUCCH resource with the lowest ID; and in step 720, the pathloss RS index corresponds to pucchPathlossReferenceRS-Id configured in the determined spatial relation for the PUSCH reception. The first spatial relation corresponding to the dedicated PUCCH resource with the lowest ID means the spatial relation activated first in the MAC CE activation command among the spatial relations activated for the dedicated PUCCH resource with the lowest ID.

For example, referring to FIG. 1 in combination with method 700, the dedicated PUCCH resource with the lowest ID is PUCCH resource #0; and the first spatial relation corresponding to PUCCH resource #0 is spatial relation #5. Therefore, in step 710, the BS may determine a spatial relation for the PUSCH reception corresponding to spatial relation #5; and in step 720, the pathloss RS index of the PUSCH corresponds to a pucchPathlossReferenceRS-Id configured in the spatial relation #5, and the BS receives the PUSCH at least according to the spatial relation #5 with a reception power calculated based on the pathloss RS.

In some embodiments, in step 710, the BS may determine the spatial relation for the PUSCH reception at least according to the spatial relation with the lowest PUCCH-SpatialRelationInfoId of the dedicated PUCCH resource with the lowest ID, and in step 720, the pathloss RS index corresponds to pucchPathlossReferenceRS-Id configured in the determined spatial relation for the PUSCH reception.

For example, referring to FIG. 1 in combination with method 700, the dedicated PUCCH resource with a lowest ID is PUCCH resource #0. The spatial relation with a lowest PUCCH-SpatialRelationInfoId of the dedicated PUCCH resource with the lowest ID is spatial relation #2. Therefore, in step 710, the BS may determine the spatial relation for the PUSCH reception at least according to spatial relation #2; and in step 720, the pathloss RS index of the PUSCH corresponds to a pucchPathlossReferenceRS-Id configured in the spatial relation #2, and the BS receives the PUSCH at least according to the spatial relation #2 with a reception power calculated based on the pathloss RS.

In some embodiments, in step 710, the BS may determine the spatial relation for the PUSCH reception at least according to the spatial relation corresponding to the dedicated PUCCH resource with the lowest ID among at least one PUCCH resource activated with only one spatial relation in the active BWP of the serving cell, and in step 720, the pathloss RS index corresponds to pucchPathlossReferenceRS-Id configured in the determined spatial relation for the PUSCH reception.

For example, referring to FIG. 1, only PUCCH resource #1 is activated with one spatial relation (i.e., spatial relation #0); therefore, the dedicated PUCCH resource with the lowest ID among at least one PUCCH resource activated with only one spatial relation is PUCCH resource #1. In step 710, the BS may determine the spatial relation for the PUSCH reception at least according to spatial relation #0. In step 720, the pathloss RS index of the PUSCH corresponds to a pucchPathlossReferenceRS-Id configured in the spatial relation #0, and the BS receives the PUSCH at least according to the spatial relation #0 with a reception power calculated based on the pathloss RS.

Referring to FIG. 6 again. As shown in FIG. 6, PUCCH resource #2, PUCCH resource #3, PUCCH resource #5, and PUCCH resource #7 are activated with one spatial relation. The dedicated PUCCH resource with the lowest ID among at least one PUCCH resource activated with only one spatial relation is PUCCH resource #2. therefore, in step 710, the BS may determine the spatial relation for the PUSCH reception at least according to spatial relation #33; and in step 720, the pathloss RS index of the PUSCH corresponds to a pucchPathlossReferenceRS-Id configured in the spatial relation #33, and the BS receives the PUSCH at least according to the spatial relation #33 with a reception power calculated based on the pathloss RS.

The present disclosure provides a solution for transmitting and receiving a PUSCH scheduled by DCI format 0_0 in a case where the PUCCH resource with the lowest ID is activated with at least two spatial relations, and the solution does not increase additional signaling overhead.

There are other methods that may be used to determine the spatial relation for the PUSCH transmission and reception scheduled by DCI format 0_0 when the PUCCH resource with the lowest ID is activated with at least two spatial relations. For example, the BS may specify one of the at least two spatial relations of the PUCCH resource with the lowest ID in the active uplink BWP in the serving cell, and determine the spatial relation for the PUSCH reception at least according to the specified spatial relation, and may sends the information of the determined spatial relation to the UE through a configuration, a signaling, an indication, or the like, or the UE may specify one of the at least two spatial relations of the PUCCH resource with the lowest ID following the same regulation. The UE may use the determined spatial relation and the pathloss RS index corresponding to pucchPathlossReferenceRS-Id configured in the determined spatial relation for PUSCH transmission. This method may need additional signaling overhead.

Referring back to FIG. 1 again as an example. The BS may determine a spatial relation for the PUSCH transmission and reception at least according to spatial relation #2 and notify the UE through a signaling. The UE may perform a PUSCH transmission according to the notified spatial relation and the pathloss RS index corresponds to pucchPathlossReferenceRS-Id configured in the notified spatial relation, and the BS may receive the PUSCH at least according to spatial relation #2 and the pathloss RS index corresponding to pucchPathlossReferenceRS-Id configured in the spatial relation #2.

The various method and implements are backward compatible. That is to say, the various method and implements provides in the present disclosure may also be used when the PUCCH resource with the lowest ID is activated with only one spatial relation. If the PUCCH resource with the lowest ID is activated with only one spatial relation, according to various implements of the present disclosure, the spatial relation activated for the PUCCH resource with the lowest ID is determined for the transmission and reception of the PUSCH scheduled by DCI format 0_0.

Considering a scenario where each PUCCH resource (including the PUCCH resource with the lowest ID) configured in an active uplink BWP in a serving cell may be activated with one or more spatial relation, the various method and implements provides in the present disclosure may also be used for the PUSCH transmission and reception. In some cases, the BS may mandatorily regulates that the PUCCH resource with the lowest ID is activated with only one spatial relation, and the UE may use the spatial relation corresponding to the PUCCH resource with the lowest ID for the PUSCH transmission and reception. Regarding the PUCCH resources other than the PUCCH resource with the lowest ID, they may be activated with one or more spatial relations.

Figure 8:
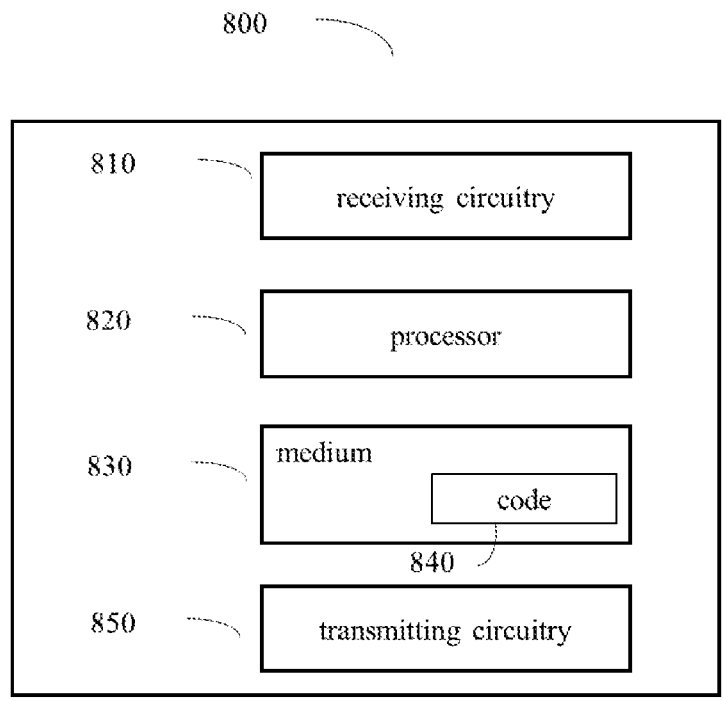
FIG. 8 illustrates an exemplary block diagram of at least a part of a UE according to the embodiments of the subject disclosure.

FIG. 8 illustrates a block diagram of at least part of a UE 800 according to the embodiments of the subject disclosure. The UE 800 may include a receiving circuitry, a processor, and a transmitting circuitry. In one embodiment, the UE may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement the steps shown in method 200 or the aforementioned embodiments with the receiving circuitry, the transmitting circuitry and the processor.

Figure 9:
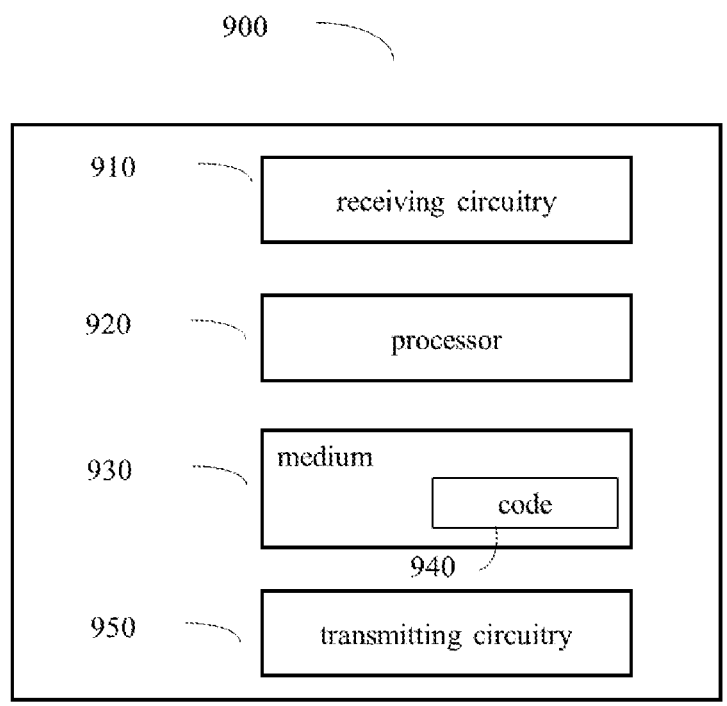
FIG. 9 illustrates an exemplary block diagram of at least a part of a BS according to the embodiments of the subject disclosure.

FIG. 9 illustrates a block diagram of at least part of a BS 900 according to the embodiments of the subject disclosure. The BS 900 may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement the steps shown in method 700 or the aforementioned embodiments with the receiving circuitry, the transmitting circuitry and the processor.

In various example embodiments, the at least one processor 820 or 920 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 820 or 920 may also include at least one other circuitry or element not shown in FIG. 8 or 9.

In various example embodiments, the at least one medium 830 or 930 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further, the at least medium 830 or 930 may include, but are not limited to, an electric, a magnetic, an optical, an electromagnetic, an infrared, or a semiconductor system, apparatus, or device or any combination of the above.

Further, in various example embodiments, the example apparatus 900 or 1000 may also include at least one other circuitry, element, and interface, for example antenna element, and the like.

In various example embodiments, the circuitries, parts, elements, and interfaces in the example apparatus 800 or 900, including the at least one processor 820 or 920 and the at least one medium 830 or 930, may be coupled together via any suitable connections including, but not limited to, buses, crossbars, wiring and/or wireless lines, in any suitable ways, for example electrically, magnetically, optically, electromagnetically, and the like.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:
   at least one memory; and
   at least one processor coupled with the at least one memory and operable to cause the UE to:
      determine a spatial relation for a Physical Uplink Shared Channel (PUSCH) transmission scheduled by Downlink Control Information (DCI) format 0_0 in response to a Physical Uplink Control Channel (PUCCH) resource with a lowest Identification (ID) among at least one PUCCH resource configured in an active uplink bandwidth part (BWP) of a serving cell being activated with at least two spatial relations; and
      perform the PUSCH transmission at least according to the spatial relation with a transmission power calculated based on a pathloss reference signal (RS) with an index corresponding to pucchPathlossReferenceRS-Id configured in the determined spatial relation.

2. The UE of claim 1, wherein to determine the spatial relation for the PUSCH transmission, the at least one processor is operable to cause the UE to:
   determine the spatial relation for the PUSCH transmission at least according to a first spatial relation corresponding to the PUCCH resource with the lowest ID.

3. The UE of claim 1, wherein to determine the spatial relation for the PUSCH transmission, the at least one processor is operable to cause the UE to:

determine the spatial relation for the PUSCH transmission at least according to a spatial relation with a lowest PUCCH-SpatialRelationInfoId corresponding to the PUCCH resource with the lowest ID.

4. The UE of claim 1, wherein to determine the spatial relation for the PUSCH transmission, the at least one processor is operable to cause the UE to:
determine the spatial relation for the PUSCH transmission at least according to a spatial relation corresponding to a different PUCCH resource with another lowest ID among at least one PUCCH resource activated with one spatial relation.

5. The UE of claim 4, wherein the determining is in response to that the PUCCH resource with the lowest ID is activated with at least two spatial relations.

6. A network entity for wireless communication, comprising:
at least one memory; and
at least one processor coupled with the at least one memory and operable to cause the network entity to:
determine a spatial relation for a Physical Uplink Shared Channel (PUSCH) reception scheduled by Downlink Control Information (DCI) format 0_0 in response to a Physical Uplink Control Channel (PUCCH) resource with a lowest Identification (ID) among at least one PUCCH resource configured in an active uplink bandwidth part (BWP) of a serving cell being activated with at least two spatial relations; and
perform the PUSCH reception at least according to the spatial relation with a reception power calculated based on a pathloss reference signal (RS) with an index corresponding to pucchPathlossReferenceRS-Id configured in the determined spatial relation.

7. The network entity of claim 6, wherein to determine the spatial relation for the PUSCH reception, the at least one processor is operable to cause the network entity to:
determine the spatial relation for the PUSCH reception at least according to a first spatial relation corresponding to the PUCCH resource with the lowest ID.

8. The network entity of claim 6, wherein to determine the spatial relation for the PUSCH reception, the at least one processor is operable to cause the network entity to:
determine the spatial relation for the PUSCH reception at least according to a spatial relation with a lowest PUCCH-SpatialRelationInfoId corresponding to the PUCCH resource with the lowest ID.

9. The network entity of claim 6, wherein to determine the spatial relation for the PUSCH reception, the at least one processor is operable to cause the network entity to:
determine the spatial relation for the PUSCH reception at least according to a spatial relation corresponding to a different PUCCH resource with another lowest ID among at least one PUCCH resource activated with one spatial relation.

10. The network entity of claim 9, wherein the determining is in response to that the PUCCH resource with the lowest ID is activated with at least two spatial relations.

11. The network entity of claim 6, wherein the network entity comprises a base station (BS).

12. The network entity of claim 11, wherein the at least one processor is operable to cause the network entity to receive the PUSCH reception from a user equipment (UE) while the UE is in a Radio Resource Control (RRC) connected mode.

13. The network entity of claim 6, wherein the at least one PUCCH resource includes a dedicated PUCCH resource configured in PUCCH-Config.

14. A method performed by a user equipment (UE), the method comprising:
determining a spatial relation for a Physical Uplink Shared Channel (PUSCH) transmission scheduled by Downlink Control Information (DCI) format 0_0 in response to a Physical Uplink Control Channel (PUCCH) resource with a lowest Identification (ID) among at least one PUCCH resource configured in an active uplink bandwidth part (BWP) of a serving cell being activated with at least two spatial relations; and
performing the PUSCH transmission at least according to the spatial relation with a transmission power calculated based on a pathloss reference signal (RS) with an index corresponding to pucchPathlossReferenceRS-Id configured in the determined spatial relation.

15. The method of claim 14, wherein the determination of the spatial relation for the PUSCH transmission further comprises:
determining the spatial relation for the PUSCH transmission at least according to a first spatial relation corresponding to the PUCCH resource with the lowest ID.

16. The method of claim 14, wherein the determination of the spatial relation for the PUSCH transmission further comprises:
determining the spatial relation for the PUSCH transmission at least according to a spatial relation with a lowest PUCCH-SpatialRelationInfoId corresponding to the PUCCH resource with the lowest ID.

17. The method of claim 14, wherein the determination of the spatial relation for the PUSCH transmission further comprises:
determining the spatial relation for the PUSCH transmission at least according to a spatial relation corresponding to a different PUCCH resource with another lowest ID among at least one PUCCH resource activated with one spatial relation.

18. The method of claim 17, wherein the determining is in response to that the PUCCH resource with the lowest ID is activated with at least two spatial relations.

19. The method of claim 14, wherein the at least one PUCCH resource includes a dedicated PUCCH resource configured in PUCCH-Config.

20. The method of claim 14, wherein the method is performed while the UE is in a Radio Resource Control (RRC) connected mode.

* * * * *